United States Patent [19]

Sanabria

[11] 4,040,008
[45] Aug. 2, 1977

[54] AUTOMOBILE TIRE THEFT ALARM

[76] Inventor: Pedro Sanabria, 133 Centennial Ave., Roosevelt, N.Y. 11575

[21] Appl. No.: 664,096

[22] Filed: Mar. 5, 1976

[51] Int. Cl.² .............................................. B60R 25/10
[52] U.S. Cl. ....................................... 340/65; 340/280
[58] Field of Search ................... 340/63, 65, 261, 272, 340/273, 274 R, 278, 280, 282

[56] References Cited

U.S. PATENT DOCUMENTS 3,253,271  12/1963  Trupiano et al. ...................... 340/280

Primary Examiner—Alvin H. Waring
Attorney, Agent, or Firm—Stephen E. Feldman; Marvin Feldman

[57] ABSTRACT

One or more support plates are secured to frame portions of a motor vehicle each in proximity to one of the wheel suspension systems of the vehicle. Hingedly mounted on each support plate is a control plate. Each control plate has a free end positioned to coact with a portion of the wheel suspension system (wheel balancer, upper or lower control arm, shock absorbers, springs) and more particularly that portion of the wheel suspension system which will drop or move downwardly when the vehicle is jacked up in preparation to remove a tire. A mounting bracket is adjustably carried by each support plate in proximity to the control plate hingedly carried thereby. An electrical switch is positioned on each mounting bracket with the operating element for its contacts positioned for coaction with its respective control plate to be operated thereby in response to movement of the associated movable portion of the wheel suspension system. Each switch is, in turn, electrically interconnected in a circuit with electrical power and an alarm device such that switch actuation will sound the alarm in response to the raising of the vehicle in preparation to remove one or more of its tires. The electrical power and alarm device can either be the vehicles own battery and horn or separate battery power and noise making device.

10 Claims, 5 Drawing Figures

AUTOMOBILE TIRE THEFT ALARM

BACKGROUND OF THE INVENTION-FIELD OF APPLICATION

This invention relates to alarm systems and more particularly to alarm systems for use with motor vehicles.

BACKGROUND OF THE INVENTION-DESCRIPTION OF PRIOR ART

Motor vehicle thefts have been occurring at an unprecedented pace. The escallating unit price for the vehicles, whether they be cars or trucks, and the increased number of eligible drivers account for a good portion of the thefts.

The motor vehicle thefts have, in turn, resulted in a great activity in the field of alarm devices specifically designed for use with motor vehicles. Some of these alarm devices are responsive to the unauthorized energization of the vehicles ignition; while others respond to continued movement of the vehicle when same should be at rest. Still others of these alarm devices are responsive to even the slightest movement of the vehicle. Motor vehicle alarms of this latter type are shown for example in U.S. Pat. No. 1,846,996 granted to R. H. Hausse on Feb. 23, 1932 for Alarm For Automobiles; U.S. Pat. No. 3,160,868 granted to J. Kowanda on Dec. 8, 1964 for Theft Alarm For Motor Vehicles; and U.S. Pat. No. 3,562,706 granted on Feb. 9, 1971 to B. D. Mason for Vehicle Self Leveling Vibration Sensitive Alarm Device.

However the more sensitive the alarm to vehicle movement and vibration the more often it will sound merely because someone happens to sit on the vehicle when it is parked; or merely due to vibrations or movement of the vehicle in response to the passing of another vehicle. Such false alarms can be annoying and embarrassing to the vehicle owner. If they occur too often the owner will avoid using the alarm, thus defeating the entire purpose for having same.

In addition such alarms are designed to react to theft of the entire vehicle. Quite often it is not the entire vehicle which is stolen but only a portion thereof such as the tires. This may be especially true for old vehicles because while they may be too old to be of value for purposes of theft they may still have new, or relatively new tires mounted thereon. Also it is somewhat easier to locate an entire stolen vehicle then it is to locate a part thereof such as its tires. Tire theft has thus become a very serious problem especially in cities where garages are at a premium and those available are relatively expensive. In such an environment parking in the street is the only recourse available, and this places the vehicle in an ideal location for thieves. Tires thus stolen are easily either used by the thief or easily and quickly disposed of for ready cash.

Available alarm devices for preventing theft of entire vehicle quite often are not appropriate or efficient for preventing theft of vehicle tires.

SUMMARY OF THE INVENTION

It is therefore an object of this invention to provide a novel and improved theft alarm device.

It is another object of this invention to provide a novel and improved theft alarm for use on a motor vehicle.

It is a further object of this invention to provide a novel and improved vehicle theft alarm responsive to the unauthorized lifting of a motor vehicle.

It is yet another object of this invention to provide a novel and improved vehicle theft alarm responsive to the unauthorized lifting of a motor vehicle in preparation for removal of one or more of the wheels thereof.

It is yet still another object of this invention to provide a novel and improved vehicle alarm actuating device.

It is still another object of this invention to provide a novel and improved vehicle theft alarm responsive to a predetermined movement of the wheel suspension system to sound an alarm.

This invention involves a motor vehicle theft alarm which sound upon lifting of a portion of a vehicle as would happen prior to removal of a tire.

In carrying out the invention, according to the preferred embodiment, a control plate is hingedly mounted so that its free end swings in response to movement of a portion of the vehicle suspension system as it would move when the vehicle is being lifted in preparation to remove a tire. Such movement of the control plate, in turn, operates the actuating element of an electrical switch to make a circuit and sound an alarm. Suitable mounting elements are provided for the control plate and the switch to position the control plate with respect to the vehicle suspension system and the switch with respect to the control plate. In addition appropriate means are connected to the switch to sound the alarm and to provide power for sounding the alarm.

Other objects, features, and advantages of the invention, in its details of construction and arrangement of parts, will be seen from the above, from the following description of the preferred embodiment when considered in conjunction with the drawing and from the appended claims.

DESCRIPTION OF THE PREFERRED EMBODIMENT

For convenience, the invention will be described as applied to a theft alarm for use with an automobile and wherein a metal control plate is hingedly mounted for engagement with the balancer or upper control arm of the wheel suspension system for one of the wheels of the vehicle, and wherein lifting of the vehicle, in preparation for tire removal, causes the free end of the plate to move away from the actuator for an electrical switch to operate same and close an electrical circuit to sound an alarm; it being usderstood, nevertheless that without departing from the scope of this invention that subject theft alarm may be used with the wheel suspension system of a small truck or other motor vehicle, that the control plate need not be metal and may be mounted in any convenient manner so as to move downwardly when the vehicle is lifted and that the switch may be engaged and actuated by the control plate as it moves downwardly.

Figure 1:
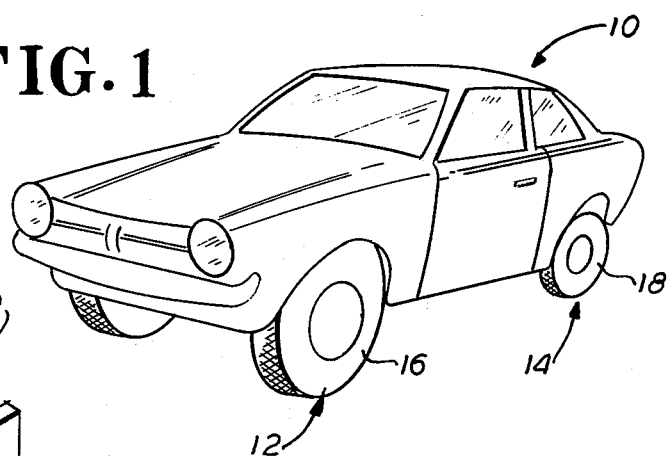
FIG. 1 is a schematic view of a motor vehicle, in the form of an automobile, to which the instant invention may be applied.

With reference to FIG. 1 there is generally shown at 10 a motor vehicle in the form of an automobile having front wheels 12 and rear wheels 14 supported thereon in conventional manner (not shown). In general the suspension system for front wheels 12 involves conventionally available ball joints disposed for coaction with upper and lower control arms of an A frame. This may also involve a wheel balancer. Suitable springs and joints complete the suspension for each wheel; there being such a suspension system for each front wheel. Left and right rear wheels 14 are conventionally carried at the end of wheel axels mounted to the main frame of automobile 10 by means of leaf springs, (or coil springs) and shock absorbers.

Each wheel suspension system reacts substantially in the same way when automobile 10 is jacked up, or otherwise lifted, in preparation for removing a wheel 12 or 14 as one would do to change a tire 16, or 18 respectively carried thereby. Such reaction, which is well known to anyone who has had to change a flat tire, appears as a relaxation of the wheel suspension systems for the wheel or wheels near the portion of the automobile being lifted. This leaves the tire touching the ground while the vehicle body raises up. After a while the wheel suspension system also moves up to raise the wheel and tire off the pavement to permit removal thereof.

As set forth above, when automobile 10 is jacked up some elements of the wheel suspension system must stay with the wheel due to its weight, and the inherent built in pivotal interconnection between certain elements of the wheel suspension. Automobile 10 thus raises up while its wheel remains on the pavement until the configuration of the particular wheel suspension ends such pivoting action and causes the wheel to raise up with the vehicle. When the wheel has been thus raised above the pavement it can be removed.

In essence it is also possible to say that with respect to the vehicle being so jacked up the respective portion of the wheel suspension moves relatively downwardly or drops. This action continues until such time when the entire wheel moves upwardly with automobile 10.

Figure 2:
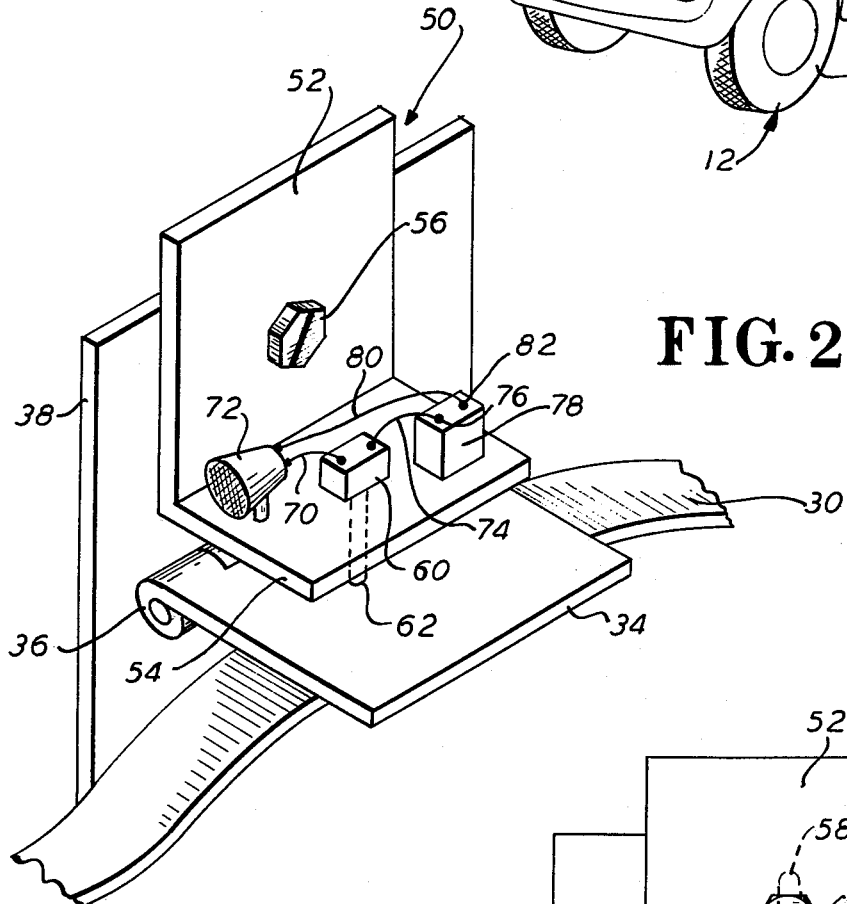
FIG. 2 is a perspective view of an alarm device embodying the instant invention as it would be disposed for coaction with part of the suspension system of the automobile of FIG. 1.
Figure 3:
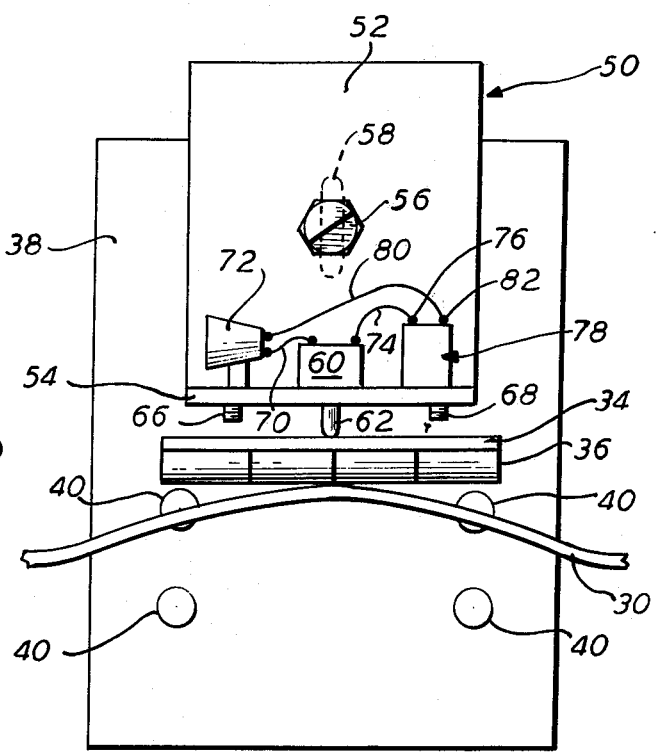
FIG. 3 is a front elevational view of the alarm device of FIG. 2.
Figure 4:
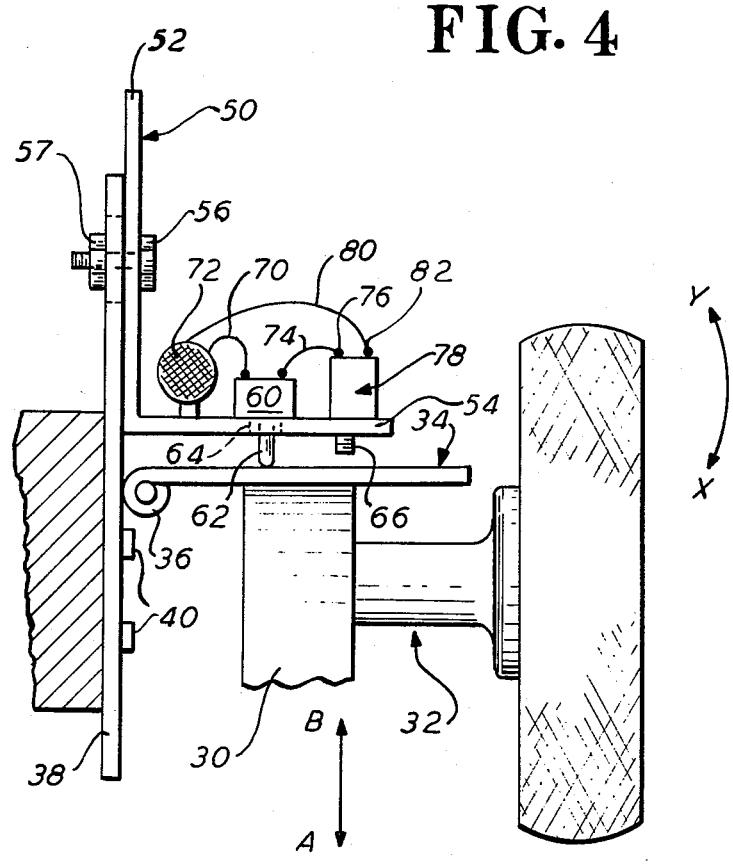
FIG. 4 is a side elevational view of the alarm device of FIGS. 2 and 3.

In FIGS. 2, 3 and 4 there is schematically shown at 30 a portion of the vehicle wheel suspension system (shown schematically at 32 in FIG. 4) which so moves downwardly with respect to the vehicle frame, as the frame moves upwardly when said frame and vehicle are being raised in preparation for wheel removal. Element 30, for a typical front wheel suspension system, could be a part of the wheel balancer, or a part of one of the control arms (upper or lower) of the A frame which interconnects the ball joints to the vehicle body. It might also be a part of the shock absorber or the spring included in such a front wheel suspension system. For a typical rear wheel suspension system element 30 could be a part of its spring or shock absorber; or a similar portion thereof. The criteria for element 30 thus is that it form part of one of the suspension systems for a vehicle wheel; and that when such vehicle is being lifted, in preparation for removing a tire, such element 30 must initially move downwardly with respect to the vehicle as it is being raised.

A control plate 34 is disposed with a free end resting upon portion 30 of wheel suspension 32; and with its other end connected by a pair of hinges 36 to a mounting plate 38. Mounting plate 38 is fixedly secured, as by threaded members 40 (FIG. 3) to a frame member of automobile 10 proximate element 30 of wheel suspension 32.

A mounting bracket 50 having a vertical leg 52 and a horizontal leg 54 is secured to mounting plate 38 by means of a bolt 56 which is passed through an appropriate aperture (not shown) in vertical leg 52 of bracket 50 and an elongated slot 58 (FIG. 3) formed in mounting plate 38. A suitable nut 60 (FIG. 4) secures mounting bracket 50 in place on mounting plate 38. Elongated slot 38 permits vertical adjustment of mounting bracket 50 on mounting plate 38 and with respect to control plate 34 for purposes to be hereinafter described.

An electrical switch 60 is mounted on horizontal leg 54 of mounting bracket 50. An actuating plunger 62 for switch 60 extends through an aperture 64 (FIG. 4), formed in leg 54, to engage the upper surface of control plate 34. When control plate 34 is disposed in its normal and substantially horizontal position, as will be hereinafter explained, its coaction with plunger 62 of switch 60 will be such as to keep plunger 62 depressed with respect to switch 60. This is accomplished by vertical adjustment of mounting bracket 50, with respect to mounting plate 38, to so locate switch 60 and its plunger 62 at a proper distance from control plate 34 to establish the depressed condition for plunger 62. The positioning of mounting bracket 50 on mounting plate 38 is accomplished by loosening bolt 56 and its nut 60 and sliding same in elongated slot 58 until bracket 50 is properly positioned. Bolt 56 and nut 60 are then tightened to secure the positioning of bracket 50.

A pair of pressure members 66, 68 (FIG. 3) in the form of screws, are threaded up into the bottom of horizontal leg 54 of mounting bracket 50. Members 66 and 68 are positioned to restrict the extent of upward travel (in the direction of arrow B FIG. 4) of control plate 34 against plunger 62 and towards leg 54 to protect the components of switch 60.

The electrical contacts (not shown) for switch 60 are selected to be open when plunger 62 is depressed as described above; and to be closed upon movement of plunger 62 to an undepressed condition. Such movement of plunger 62 to an undepressed condition would occur upon movement of suspension element 30 away from horizontal leg 54 of mounting bracket 50 (in the direction of arrow A FIG. 4) and corresponding pivotal movement of control plate 34 in the direction of arrow X (FIG. 4).

One of the electrical contacts for switch 60 is interconnected by an electrical conductor 70 (FIGS. 3 and 4) to a noise producing device 72. Noise device 72 may be a conventionally available buzzer, siren, horn or like and may be mounted in any convenient manner to leg 54 of mounting bracket 50. The other contact of switch 60 is interconnected by electrical conductor 74 to one terminal 76 of a battery 78 with suitable power to operate alarm device 72. An electrical conductor 80, which is connected to one of its ends to the other terminal 82 of battery 78 and at its other end to alarm device 72, completes the circuit.

Thus when vehicle 10 is at rest the relationship of element 30, of the suspension system for any of its wheels, to control plate 34 will be such as to maintain plunger 62 depressed, the contacts of switch 60 open, and alarm device unactuated. Any unauthorized lifting of vehicle 10, as would occur if someone where to jack same up in preparation to remove a wheel, results in a movement of element 30 downwardly (in the direction of arrow A FIG. 4) with respect to the main frame of vehicle 10. As element 30 moves down control plate 34 follows relaxing its pressure on plunger 62 and permitting same to move to an undepressed condition. The contacts in switch 60 close completing the circuit to connect battery 78 to alarm device 72. Alarm device 72 sounds putting all within hearing distance in notice that vehicle 10 is being tampered with.

It should be obvious that the contacts of switch 60 may just as easily be connected by appropriate electrical connections to the electrical system provided with vehicle 10 if it is desired to elminate battery 78. Or, in the alternative, that the contacts of switch 60 electrically connected to a suitable battery 78 may be connected, by suitable electrical connecting means, to the vehicles horn to sound same instead of alarm device 72 if it is desired to eliminate device 72. It thus follows that both battery 78 and alarm device 72 may be replaced by suitably interconnecting the contacts of switch 60 to the battery and horn of vehicle 10.

Figure 5:
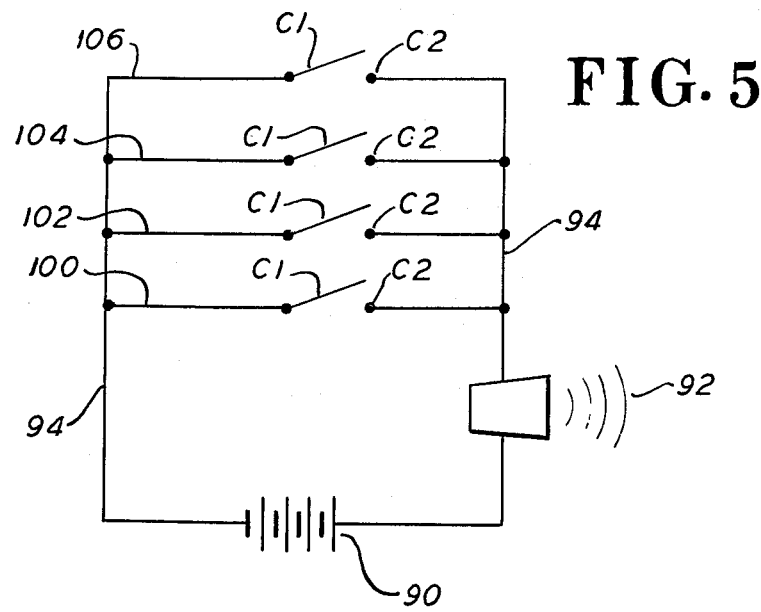
FIG. 5 is a schematic view of an electrical wiring diagram usable with the alarm device of FIGS. 2, 3 and 4.

In most instances a thief will remove all four wheels from vehicle 10 and so a single alarm device may be sufficient. A pair of alarm devices installed one for one of the front wheels and for one for one of the rear wheels might also be a sufficient. Complete protection for all four wheels is easily accomplished by installing an alarm actuating device (control plate 34, switch 60 with plunger 62, mounting bracket 50, and mounting plate 38) for co-operation with each of the four wheels suspension systems. Such an installation could either utilize an alarm device 72 and battery 78 for each such alarm actuating device or, in the alternative, could be interconnected in a single electrical circuit, as shown in FIG. 5, to a single power source 90 and a single alarm device 92.

Power source 90 may be the battery normally provided with vehicle 10 or a separate one; while alarm device 92 may be the horn normally provided for vehicle 10 or a separate horn, buzzer, siren, or other convenient and conventional noise making mechanism.

In either instance suitable electrical connections 94 interconnect alarm device 92 and power source in parallel with four actuating circuits 100, 102, 104 and 106. Each such circuit includes a pair of normally open contacts C-1 and C-2 which are contained in their respective switches 60. Contacts C-1 and C-2 of each switch are arranged to be actuated by movement of their respective plungers 62 as described above for the embodiment of FIGS. 2-4. Such actuation, which will occur in response to an unauthorized lifting of a portion of vehicle 10 in preparation for removing a wheel, will, in turn, connect power source 90 to alarm device 92 to sound same creating the desired alarm.

From the above description it will thus be seen that a novel and improved motor vehicle wheel theft alarm and alarm actuating device has been provided; which device is relatively simple in construction and operation and relatively easy to understand, install and operate.

It is understood that although I have shown the preferred form of my invention that various modifications may be made in the details thereof without departing from the spirit as comprehended by the following claims:

I claim:
1. An alarm actuating device for indicating the removal of part of a motor vehicle comprising:
   a. a mounting plate;
   b. a control plate swingably mounted on said mounting plate for swinging movement between a first predetermined position and a second predetermined position;
   c. a mounting bracket having a first leg adjustably positionable on said mounting plate and a second leg positionable along with said first leg in relation to said control plate;
   d. electrical switch means carried by said mounting bracket and having a pair of contacts adapted to be selectively opened and closed; and
   e. a switch contact actuating member disposed for coaction with said pair of contacts of said switch means to either maintain same spaced apart or permit same to close;
   f. said switch contact actuating member further being disposed for co-operation with said control plate in said first predetermined position of said control plate to maintain said pair of contacts spaced apart, and in second predetermined position of said control plate to permit said pair of contacts to close to indicate the removal of part of a motor vehicle.

2. The alarm actuating device of claim 1 wherein a source of power and an alarm device for producing an audible sound are interconnected by electrical circuit means to said pair of switch contacts such that said alarm device is energized when said pair of contacts close.

3. The alarm actuating device of claim 1 wherein the source of power is a battery source of power.

4. The alarm actuating device of claim 1 wherein the alarm device is a motor vehicle horn.

5. The alarm actuating device of claim 1 wherein
   a. said mounting plate is to be secured to the frame of a motor vehicle, in proximity to one of the wheel suspension systems provided therewith, and in such a manner that said control plate co-operates with a portion of the wheel suspension system which will move with respect to the vehicle frame when the vehicle is being raised up;
   b. said first predetermined position of said control plate being when said suspension system is positioned when the vehicle is not raised up and second predetermined position of said contact plate being when said suspension system is positioned when the vehicle is being raised up.

6. The alarm actuating device of claim 5 wherein said control plate is mounted on said mounting plate by a pair of spaced hinges.

7. The alarm actuating device of claim 6 wherein said mounting bracket is adjustably positioned on said mounting plate by passing a bolt through an aperture in said first leg and through an elongated slot in said mounting plate and securing same in place by a nut.

8. The alarm actuating device of claim 7 wherein said electrical switch means in mounted on an upper surface of said second leg of said mounting bracket and said switch contact actuating member is a plunger which extends from said switch means through an aperture in said second leg of said mounting bracket down towards and into contact with said control plate which is hingedly mounted therebelow.

9. The alarm actuating device of claim 8 wherein a pair of pressure members are disposed beneath said second leg of said mounting bracket in proximity of said plunger and for coaction with said control plate to restrict movement of said control plate towards said second leg thereof.

10. The alarm actuating device of claim 9 wherein a mounting plate, mounting bracket, control plate, and electrical switch means are provided for each wheel suspension system of a motor vehicle, and electrical connection means are provided to interconnect all of said electrical switch means to the source of power and alarm device.

* * * * *